Patented May 24, 1932

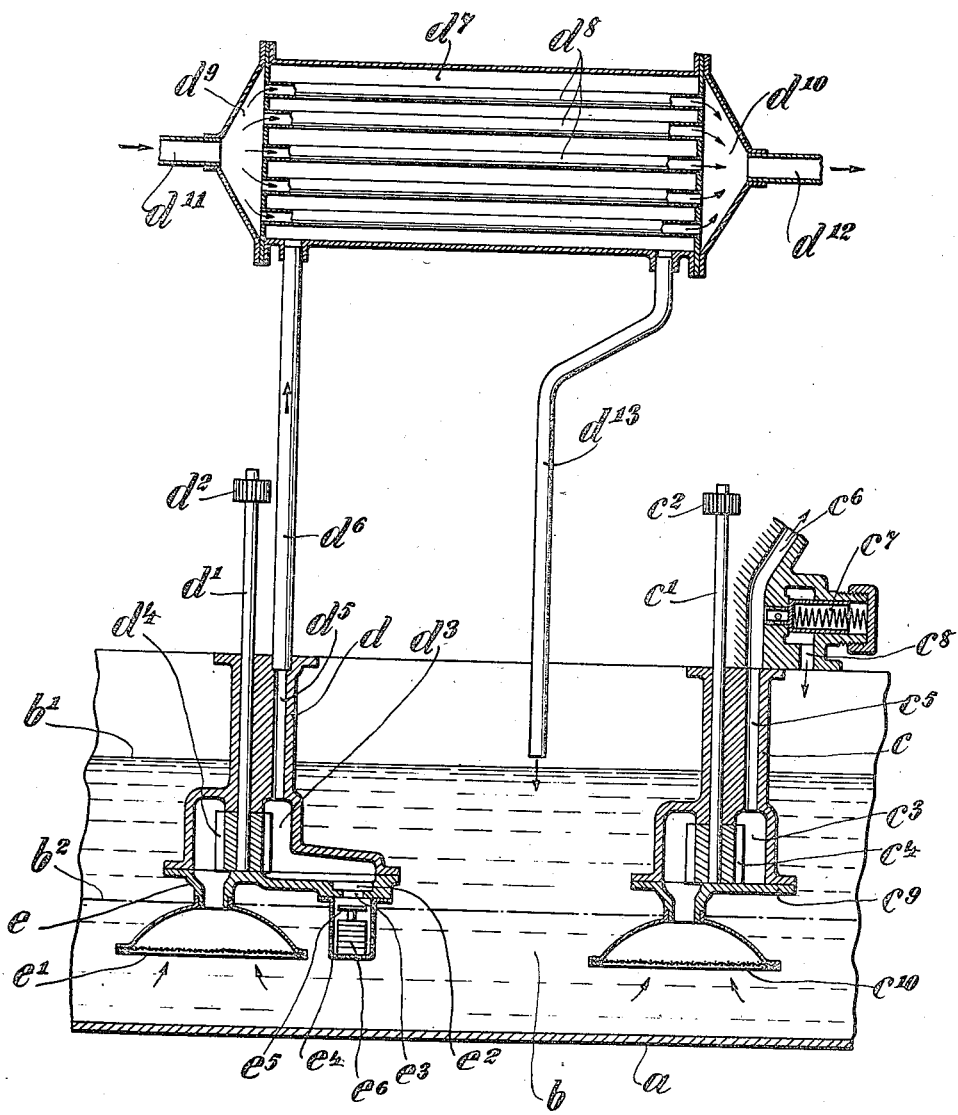

1,860,150

UNITED STATES PATENT OFFICE

BRUNO LOEFFLER, OF PLAINFIELD, NEW JERSEY, ASSIGNOR TO INTERNATIONAL MOTOR COMPANY, OF NEW YORK, N. Y., A CORPORATION OF DELAWARE

OIL COOLING SYSTEM

Application filed March 21, 1930. Serial No. 437,796.

The present invention relates to systems for cooling oil and embodies, more specifically, an improved cooling system for the lubricating oil of a motor vehicle, such system embodying an effective cooling mechanism by means of which the oil may be cooled when it reaches a predetermined temperature, the cooling mechanism being rendered inoperative automatically upon a predetermined fall in temperature of the lubricating oil.

The desirability of maintaining the temperature of the lubricating oil of a motor vehicle within predetermined limits will be readily apparent and the present invention relates to a mechanism for effecting such desired condition, it being understood that the mechanism is to be adapted for use with any form of vehicle and readily incorporated in the vehicle design.

An object of the invention is to provide an oil cooling system for a motor vehicle which functions independently of the pressure feed system for lubrication of the moving parts of the vehicle.

A further object of the invention is to provide a device of the above character by means of which the temperature of the oil may be controlled automatically, it being contemplated herein to provide a thermostat submerged within the oil to control the operation of the cooling system.

A further object of the invention is to provide a device of the above character which is automatically rendered inoperative when the engine oil is cold, thus not imposing a constant load upon the vehicle driving mechanism.

Further objects, not specifically enumerated above, will be apparent as the invention is described in greater detail in connection with the accompanying drawing, wherein the single figure is a view in section showing an oil cooling system constructed in accordance with the present invention.

Referring to the above figure, the engine crank case or other oil reservoir is shown at $a$ within which a supply of lubricating oil $b$ is maintained. The maximum oil level in the reservoir is indicated at $b'$ while the minimum oil level is indicated by the dot and dash lines $b^2$.

A pressure feed system for lubricating the vehicle includes a support $c$ within which a shaft $c'$ is journaled. A gear $c^2$ is provided on the shaft and is adapted to be driven by the engine in any approved fashion. Within the support $c$, a chamber $c^3$ is provided, preferably being formed to receive a pumping gear $c^4$ which pumps oil into conduit $c^5$ and duct $c^6$ to carry the oil to the bearings to be lubricated. A pressure relief valve $c^7$ is provided to return the lubricant to the reservoir through port $c^8$ in the event that the pressure within the duct $c^6$ reaches a predetermined maximum value.

A closure $c^9$ is provided for the chamber $c^3$ and carries a screening device $c^{10}$ by means of which the oil pumped by the gear $c^4$ may be filtered prior to being introduced into the conduit $c^5$. The foregoing pumping mechanism may be varied in construction as desired and forms no part of the present invention.

Independent of the pressure system described above, a support $d$ is provided in the reservoir carrying a shaft $d'$ which is provided with a driving gear $d^2$ similarly to the shaft $c'$. The support $d$ is formed with a chamber $d^3$ within which a pumping gear $d^4$ is mounted, this gear being driven by shaft $d'$ in a manner which will be readily apparent. Conduit $d^5$ communicates with a duct $d^6$ which carries the oil to chamber $d^7$ through which a plurality of pipes $d^8$ extend. Manifolds $d^9$ and $d^{10}$ communicate with inlet and exhaust pipes $d^{11}$ and $d^{12}$, respectively, and carry a supply of cooling fluid to the chamber $d^7$. After circulating about the pipes $d^8$ the oil is returned to the reservoir through pipe $d^{13}$.

A closure $e$ is provided for the chamber $d^3$, a screening device $e'$ being mounted thereon to screen the oil prior to introducing it into the pump and cooling system described above.

Also carried upon the closure $e$ is a chamber $e^2$ which communicates with the chamber $d^3$, this chamber communicating with the oil reservoir through an aperture $e^3$ and cage $e^4$. A closure $e^5$ for the aperture $e^3$ is operated by a thermostatic element $e^6$ in such manner that below a predetermined maximum temperature the chamber $d^3$ communicates directly with the oil reservoir and serves as a by-pass for the oil, thus causing the pump to do practically no work under these conditions. When the temperature of the oil reaches the foregoing predetermined maximum, the thermostat has expanded sufficiently to cause the closure $e^5$ to close, the aperture $e^3$ thus forcing the oil through the pipes $d^6$ and $d^{13}$ and the cooling chamber $d^3$.

From the foregoing, it will be apparent that a cooling system has been provided which functions automatically to cool the oil under proper conditions. Unnecessary load upon the engine is relieved when the oil is cooled by means of the thermostatically operated valve and thus an effective and highly efficient cooling system is provided.

While the invention has been described with specific reference to the accompanying drawing, it is not to be limited, save as defined in the appended claims.

I claim as my invention:

1. In combination with an oil reservoir having a pressure feed system, a cooling device, a support in the reservoir formed with a chamber, a pump in the chamber, a conduit in the support, means including the last named means to carry oil between the reservoir and cooling device, a bypass between the reservoir and communicating means, and a thermostatically actuated valve in the bypass.

2. In combination with an oil reservoir having a pressure feed system, a cooling device, a support in the reservoir formed with a chamber, a pump in the chamber, a conduit in the support, means including the last named means to carry oil between the reservoir and cooling device, and a bypass in the support.

This specification signed this 15th day of March, A. D. 1930.

BRUNO LOEFFLER.